United States Patent [19]

Berger

[11] 4,443,883
[45] Apr. 17, 1984

[54] DATA SYNCHRONIZATION APPARATUS

[75] Inventor: Michael F. Berger, Fort Worth, Tex.

[73] Assignee: Tandy Corporation, Fort Worth, Tex.

[21] Appl. No.: 304,265

[22] Filed: Sep. 21, 1981

[51] Int. Cl.³ .................. G08C 25/00; G06F 3/00; H04L 7/00; G11B 5/06
[52] U.S. Cl. .................. 375/116; 375/110; 360/44; 360/51; 360/40; 371/47; 364/900; 364/300
[58] Field of Search ... 364/200 MS File, 900 MS File, 364/300; 375/106, 110, 113, 114, 116; 360/40, 42, 43, 44, 51; 370/100; 371/47

[56] References Cited

U.S. PATENT DOCUMENTS

| 3,395,355 | 7/1968 | Gabor | 360/43 |
| 3,737,896 | 6/1973 | Gabor | 360/43 |
| 3,838,214 | 9/1974 | Lind | 375/110 |
| 3,921,009 | 11/1975 | Combs et al. | 360/44 |
| 3,938,028 | 2/1976 | Schowe, Jr. | 371/47 |
| 3,959,816 | 5/1976 | Spiecens | 360/44 |
| 4,032,915 | 6/1977 | Shanks et al. | 360/44 |
| 4,051,539 | 9/1977 | Geddes et al. | 360/44 |
| 4,080,572 | 3/1978 | Hastings et al. | 375/95 |
| 4,112,501 | 9/1978 | Önnestam | 364/900 |
| 4,267,595 | 5/1981 | Hernandez | 360/43 |
| 4,302,845 | 11/1981 | McClaughry et al. | 375/95 |
| 4,320,525 | 3/1982 | Woodward | 360/42 |
| 4,347,606 | 8/1982 | Hoogeveen | 375/116 |

OTHER PUBLICATIONS

'Mon 1.1 Enhancement Description,' Synertek Systems Corp., First Printing: Jul. 1979.
'A Software Controlled 1200 bps Audio Tape Interface,' Byte, Apr. 1977, vol. 2, No. 4, by Carl Helmers.
'The Designer's Eye View of the AC-30' by Gary Kay, Byte, Dec. 1976, No. 16.
Apple II Reference Manual, Apple Computer Inc., 'Apple II System Monitor,' 1977.

Primary Examiner—Jerry Smith
Assistant Examiner—William G. Niessen
Attorney, Agent, or Firm—Wolf, Greenfield & Sacks

[57] ABSTRACT

Data synchronization apparatus for a 1500 baud computer-audio frequency magnetic tape recorder interface is disclosed. The synchronization apparatus automatically detects bit cell boundaries and synchronizes at both the bit level and the byte level even if the audio waveform as read from the tape is inverted, as is the case with some tape recorders. Synchronization is performed by squaring the audio waveform and measuring two successive time intervals occurring between three successive positive-going transitions and subtracting the resulting measurements. If the calculated difference is less than a predetermined amount, positive-going transitions of the waveform are selected as bit cell boundaries. If, on the other hand, the calculated difference is greater than the predetermined amount, negative-going edges are selected as bit cell boundaries. Synchronization is achieved on a byte level by shifting incoming data into a first-in/first-out buffer and examining the stored data for a predetermined bit pattern.

23 Claims, 7 Drawing Figures

DATA SYNCHRONIZATION APPARATUS

FIELD OF THE INVENTION

This invention relates to digital synchronization apparatus and, in particular, to apparatus for obtaining synchronization of decoding apparatus to a serial stream of digital data.

BACKGROUND OF THE INVENTION

Many small computers utilize an audio-frequency magnetic tape recorder as an inexpensive auxiliary data storage device. In order to utilize an audio tape recorder in this manner, an interface circuit is provided between the computer and the tape recorder which converts digital signals produced by the computer into audio-frequency tone signals that can be recorded on magnetic tape by the recorder audio circuitry. Typically, a digital signal which represents a logical "one" is converted to an audio tone of a predetermined frequency. A digital signal which represents a logical "0" is converted to an audio tone of a different predetermined frequency. The audio tones produced by the tape recorder interface can then be conveniently stored on inexpensive audio magnetic tape.

Subsequently, the recorded information can be retrieved from the tape by "playing back" the tape and reconverting the resulting audio tones into digital signals suitable for use by the associated computer.

In order to achieve reasonable information recording density on the magnetic tape only a single cycle of each audio frequency is used to represent a digital "bit". Therefore, the serial stream of audio information which is retrieved from the tape consists of a frequency-modulated waveform containing a pattern of various frequencies corresponding to the digital pattern of "1"s and "0"s in the information originally stored on the magnetic tape.

While audio tape storage is inexpensive and reliable, a synchronization problem can occur because some audio tape recorders cause an inversion of the audio signal when a stored signal is retrieved from the tape. Other tape recorders do not invert the signal when the stored information is retrieved. Whether an inversion occurs depends on specifics read circuitry in the tape recorder and may vary from brand to brand and among different models in the same brand of tape recorders. An inversion can prevent the computer-tape recorder interface from properly synchronizing to the audio signal output from the cassette recorder so that a conversion can be performed between the audio signals on the digital levels required by the associated computers.

One simple prior art solution to the inversion problem is an inverting switch. When an inverting switch is used the recorder interface first attempts to synchronize to the incoming signal and if synchronization does not occur the switch must be manually moved to invert the waveform and allow synchronization to take place. This approach is inconvenient and, in some cases, the operator of the computer may not be aware of the source of the problem and, therefore, may not be able to correct it.

It is, therefore, an object of this invention to provide cassette interface synchronization circuitry which can synchronize to a waveform whether the waveform is inverted or not.

It is a further object of the invention to perform synchronization with simplified circuitry.

It is a still further object of the invention to perform the synchronization automatically without the need for manual operator intervention.

SUMMARY OF THE INVENTION

The foregoing problem is solved and the foregoing objects are achieved in one illustrative embodiment of the invention in which positive-going and negative-going signal transitions in an incoming audio-frequency signal from a tape recorder are detected and means are provided for measuring the duration of two time intervals occurring between three successive signal transitions of the same sense. The two durations are than subtracted and the resulting difference compared to a predetermined number. If the calculated difference is greater than the number, the system is considered to be bit-synched by using signal transitions of the same sense as originally chosen. If the duration of the calculated difference is less than the predetermined number, the system achieves bit synchronization by using the transitions of opposite sense to those originally chosen. The system then achieves byte synchronization by shifting the incoming information into a shift register and checking the stored bits for a predetermined pattern.

More specifically, a software program in the computer and the tape recorder interface hardware interact by means of hardware "interrupts" to provide the detection and timing functions necessary to synchronize the incoming audio waveform. In particular, the incoming audio waveform is "squared" by a zero-crossing and limiter circuit and positive and negative going transitions of the squared waveform are detected by simple flip/flop circuitry in the tape recorder interface circuitry. In order to measure the time interval between transitions the computer starts a counter immediately after the detection of a positive-going transition. When another positive-going transition is detected, an interrupt "flag" is set by the interface hardware which, in turn, subsequently causes the computer to enter an interrupt routine which, in turn disables the counter. The number stored in the counter thereby represents the time interval between positive-going transitions. The computer then compares the number produced by the counter to a number which has been preprogrammed into the computer. If the counter number is greater than the preprogrammed number, then a decision is made that bit synchronization has been achieved using rising edges as bit cell boundaries and the computer proceeds to achieve byte synchronization. If the counter number is less than the preprogrammed number then the computer enables the negative-going edge detector to achieve bit synchronization.

DETAILED DESCRIPTION OF THE INVENTION

Figure 1:
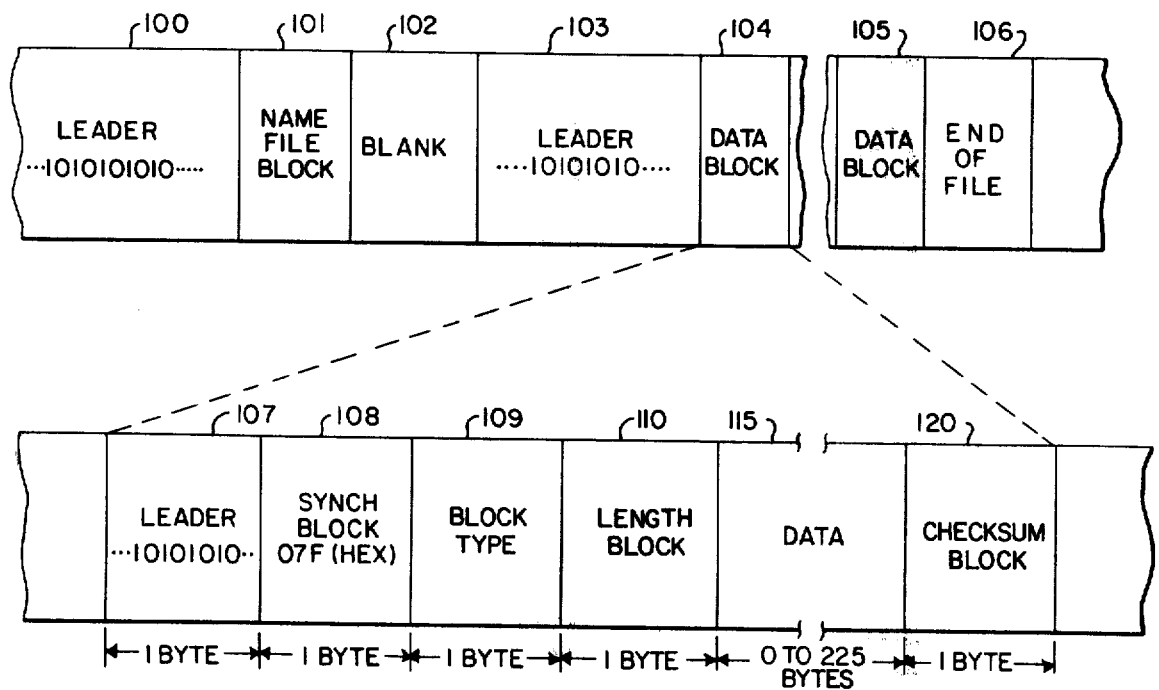
FIG. 1 shows a typical arrangement of synchronization information, identification information and data on a magnetic tape suitable for use with the inventive synchronization circuitry.

FIG. 1 of the drawing shows a schematic diagram of a length of magnetic tape on which digital data has been recorded. As mentioned previously, when this tape is used in conjunction with an audio-frequency tape recorder, data is actually stored as patterns of audio-frequency signals which are processed by the tape recorder circuitry to produce a series of audio-frequency tones upon playback. In order that synchronization can take place and data on the tape can be accurately located and retrieved, certain synchronization and identification information is also recorded on the tape.

Specifically, a fixed synchronization pattern is imbedded in the data, both in "leader" 100 located at the beginning of the magnetic tape and in "header" 107 located immediately before the data to be retrieved. Typically, the synchronization pattern in leader 100 consists of 128 bytes of alternating digital "1"s and "0"s.

After leader 100 is located name file block 101 in which a name associated with the tape is stored. Name file block 101 is followed by a blank space 102 on the tape that allows the computer software to evaluate the name stored in block 101. An additional synchronization leader consisting of 128 bytes of digital "1"s and "0"s follows blank space 102. Leader 103 is, in turn, followed on the tape by a plurality of data blocks of which only two (blocks 104 and 105) are shown. Finally, an "end of file" block is located at the physical end of the tape which, when read, informs the associated computer that it has reached the end of the tape.

Each of blocks 101 through 106 is also subdivided into a number of synchronization and identification blocks which enable the computer to interpret the stored information and retrieve the stored data. The format of each block is identical and for clarity only data block 104 is shown in detail.

In particular, each block begins with a header 107 which typically consists of one byte of code 55 in hexadecimal notation which is equivalent to one byte of alternating "1"s and "0"s. Header 107 is followed by a synchronization block 108. This block contains a predetermined pattern which, as will be described in more detail below, is used to obtain byte synchronization. Typically this pattern is 07F in hexadecimal notation which is equivalent to the binary pattern 000001111111.

Synch block 108 is followed by a block type identification block 109 which contains information which indicates whether the block is a name file block, a data block or an end of file block. The type block is, in turn, followed by a length block 110 which indicates the number of data bytes which follow.

The length block 110 is followed by the actual data which may be from 0 to 255 bytes in length in the illustrative embodiment. Each block is terminated by a checksum block 120 which contains information allowing for error detection.

Figure 2:
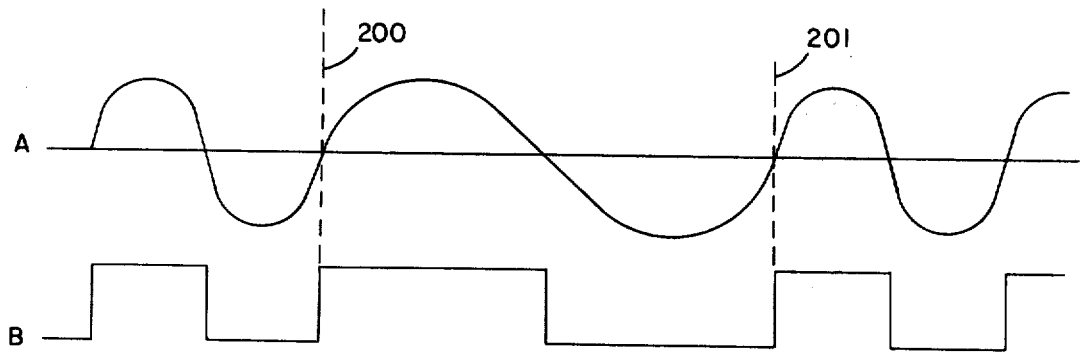
FIG. 2 shows a typical incoming audio waveform produced by an audio-frequency tape recorder when stored digital data is played back and the squared waveform produced from that waveform.

A portion of an audio waveform which is produced by the tape recorder circuitry when the synchronization pattern in the leader or header of the tape shown in FIG. 1 is read is shown in FIG. 2, line A. Typically, in a medium speed interface, for example, 1500 baud, digital "1"s are encoded as an audio signal at approximately 2400 hertz and digital "0"s are recorded at an audio signal having a frequency of 1200 hertz. Each digital bit is represented by a single cycle of the corresponding audio frequency.

Since the audio waveform is continuous, in order to synchronize to such a waveform, the synchronization circuitry must determine the location of bit cell boundaries designated as 200 and 201 in FIG. 2. To begin the synchronization process, the audio waveform is first converted into a digital waveform by a zero crossing detector and limiting circuit, resulting in the waveform shown in line B of FIG. 2. This waveform has a "high" level when a positive excursion of the waveform shown on line A occurs and a "low" level when a negative excursion of the waveform shown in line A occurs.

A comparison of lines A and B of FIG. 2 shows that the bit cell boundaries occur on the positive-going transitions of the waveform in line B.

Figure 3:
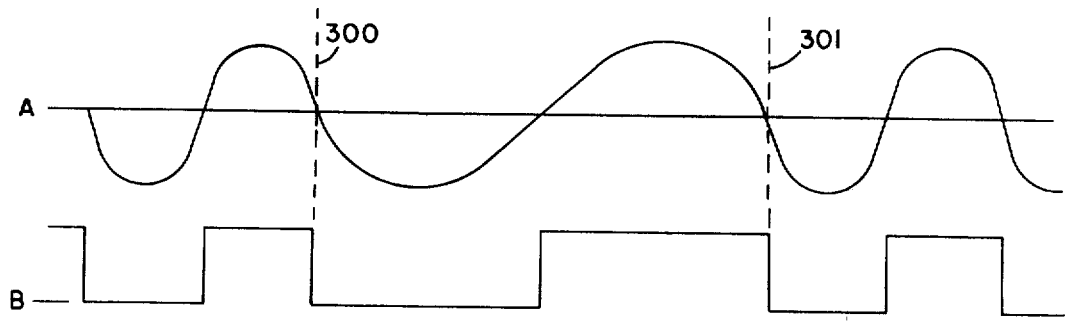
FIG. 3 shows an inverted audio waveform and the squared signal produced by that waveform.

However, as discussed previously, due to the properties of some tape recorders, it is possible that the waveform recorded as shown in line A of FIG. 2 may in fact be played back with an inversion as shown in line A in FIG. 3. When the waveform shown in line A of FIG. 3 is passed through zero crossing and limiter circuitry the waveform shown in FIG. 3, line B is produced. In this waveform, bit cell boundaries occur on the negative-going transitions of the waveform.

Unfortunately, it is not possible for the system to know in advance whether a particular tape recorder being used with the computer has an inversion or not; therfore, it is not possible for the system to known in advance whether to use positive-going or negative-going transitions as bit cell boundaries.

In order to select a transition in the proper sense as a bit cell boundary, the inventive synchronization circuitry uses positive and negative transition detectors in combination with a simple computer routine which computes the duration of the time interval of two successive positive-going transitions. By comparing this duration with preestablished limits the apparatus can decide whether positive-going or negative-going transitions should be used as bit cell boundaries.

Figure 4:
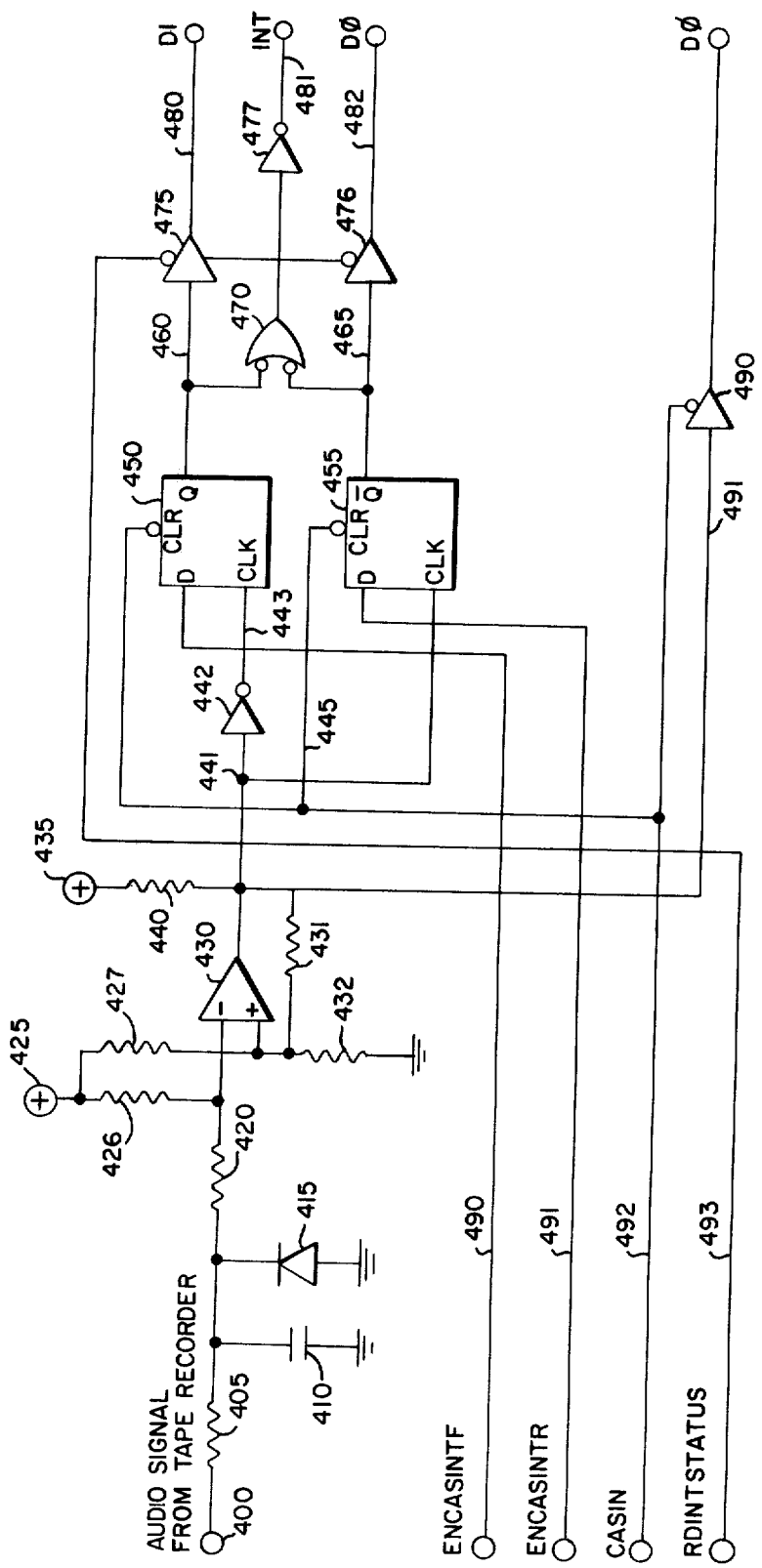
FIG. 4 is an electrical schematic diagram of the edge detector circuitry.

FIG. 4 of the drawing shows the limiting circuitry and edge detectors used in the illustrative embodiment of the invention. An audio signal from the tape recorder, such as the signal shown in line A of FIG. 2 or 3, is provided to the synchronization circuitry via terminal 400. This signal is applied, via resistors 405 and 420, to amplifier circuit 430 which operates as a zero-crossing detector. Resistor 405 and capacitor 410 are used in conjunction to provide filtering and diode 415 is used to prevent the input signal from driving the input of amplifier 430 negative. Resistor 420 in conjunction with resistor 426 provide a voltage divider which reduces the level of the signal that is applied to the negative input of amplifier 430. In the absence of any signal applied to amplifier 430, its output is normally held high by resistor 440 and voltage source 435. This high signal is applied to a voltage divider consisting of resistors 431 and 432 which in conjunction with resistor 427 connected to voltage source 425 holds the positive terminal of the amplifier at approximately 50 millivolts to provide a threshold for the incoming signal. Resistors 431 and 432 also provide hysteresis for the zero-crossing detector.

The output of zero-crossing detector 430 therefore becomes "high" when the audio input signal has a positive excursion and becomes "low" when the audio signal has a negative excursion. This output is applied, via lead 441, to the clock input of D flip/flop 455 and, via invertor 442 and lead 443, to the clock input of D flip/flop 450.

Flip/flops 450 and 455 act as edge detectors which detect a negative-going transition (falling edge) or a positive-going transition (rising edge), respectively. These detectors can be controlled by the computer via leads 490-493. For example, the rising edge detector can be enabled when the computer places a "high" signal on ENCASINTR lead 491. This "high" signal is applied to the D input of flip/flop 455. When zero-crossing detector 430 provides a rising edge via lead 441 to the clock input of flip/flop 455, the "high" signal appearing at the D input of flip/flop 455 is shifted to its output Q and its $\overline{Q}$ output becomes "low" indicating that a rising edge has been detected.

Similarly, when the computer places a "high" signal on the ENCASINTF lead, via terminal 490, this signal is applied to the D input of flip/flop 450. A falling edge produced by zero crossing detector 430 is inverted by invertor 442 and applied as a rising edge to the clock input of flip/flop 450 causing its $\overline{Q}$ output to go low, signalling the detection of a falling edge.

Both flip/flops may be cleared and reset by the computer when it places a "low" signal on the CASIN lead 492. This "low" signal is applied to the clear input of both flip/flops 450 and 455, clearing them, and removing the "low" signal from the $\overline{Q}$ outputs. In addition, the "low" signal on the CASIN lead enables buffer gate 490, via lead 491 which transfers data on the output of the zero-crossing detector 430 to output D0. Therefore, a "low" signal on the CASIN lead clears the flip/flops and displays the data present at the interface input on the D0 lead.

When one of the edge detectors is enabled by the computer and subsequentially detects an edge, the "low" signal present at the corresponding output of flip/flops 450 or 455 is applied, via leads 460 and 465, respectively, to NAND gate 470. In response to a "low" input at either of its inputs, NAND gate 470 applies a "high" signal to inverter 477 which, in turn, provides a "low" signal, via lead 481, to the INT terminal.

The INT terminal is an interrupt terminal which is inspected periodically by the computer when interrupt routines are "enabled". Interrupt routines may be enabled under control of the computer by operation of appropriate circuitry which allows the interrupt signal on terminal INT to be forwarded to the computer. When the computer detects a signal which acts as a "flag" on this terminal, as described in detail below, it enters an interrupt routine and examines the output of the edge detectors to determine if an edge has, in fact, been detected. The computer interrogates the edge detectors by placing a "low" signal on the status lead RDINTSTATUS 493. A "low" signal on this lead enables buffer gates 475 and 476, causing the outputs of flip/flops 450 and 455 to be applied, via leads 480 and 482, to the D1 and D0 output terminals, respectively.

As mentioned above, the interface circuitry shown in FIG. 4 cooperates with the software programs which achieve synchronization by means of hardware "interrupts". When an interrupt occurs, the computer stops its normal processing routine and proceeds to examine a predetermined location in memory. In this location is stored the address of an interrupt branch routine which directs the computer to an entry point in an interrupt routine which the computer then performs before returning to the routine that the computer was processing prior to the occurrence of the interrupt.

Figure 5:
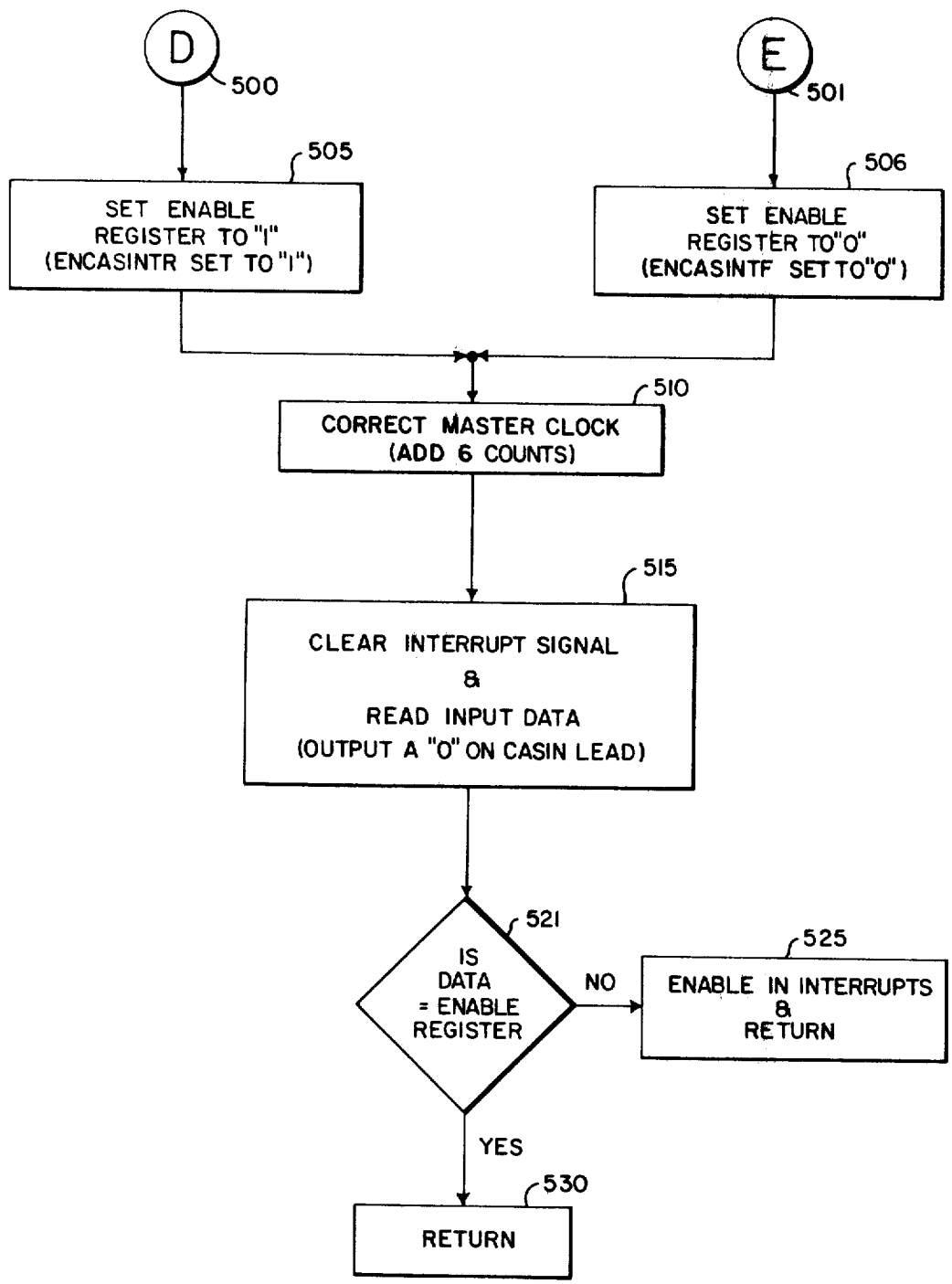
FIG. 5 is a flow chart of the software program used in the computer to process interrupts.

An interrupt routine which may illustratively be used to process interrupts produced by the tape recorder interface is shown in flow chart form in FIG. 5. This routine has two entry points, D and E, (labelled as points 500 and 501 in FIG. 5). At any given time the entry point to the routine is determined by the address stored in the interrupt branch routine and by which of leads ENCASINTR or ENCASINTF has a "high" signal thereon. Entry point 500 is used as a result of an interrupt on the detection of a rising edge and entry point 501 is used as a result of an interrupt on the detection of a falling edge. Normally, during the initial set-up of the computer routines the address in the interrupt address location is set so that, upon an interrupt, the computer enters the routine through entry point 500 corresponding to the detection of a rising edge.

Upon entering the interrupt routine via point 500, the computer sets the "E" register to a binary "1" as shown in step 505. An entry into the routine at point 501 causes the computer to set the "E" register to binary "0".

In either case, the routine proceeds to step 510 in which the pulse counter is corrected by adding six counts (the time taken by the interrupt processing routine). Normally, interrupt processing takes approximately 180 system clock cycles (also called "T-states") which is an equivalent time to six pulse counts.

In step 515, the computer clears the interrupt signal and simultaneously reads data from the zero-crossing detector by placing a "low" signal on the CASIN lead, which, as previously described, resets the edge detectors and causes data at the output of the zero-crossing detector to appear on the D0 lead.

In step 521, the data on the D0 lead is compared to the contents of the enable register. If there is a match, as indicated by advancement of the program to step 530, valid data has been detected and the interrupt routine returns control of the system to the routine to which the computer was processing prior to the interrupt. If, on the other hand, there is no match between the data and the enable register, as indicated by the routine proceeding to step 525, the computer reenables the interrupt mechanism and returns to the processing program.

The interrupt routine is used in connection with a simple counting routine in order to produce a count number (or time the duration between either two successive falling edges or rising edges). The counting routine (not shown) periodically increments a counter until the routine is interrupted by the occurrence of either a rising or falling edge (depending on which detector is enabled). When such an interrupt does occur, control of the system is transferred to the interrupt routine, as previously described, which verifies a valid interrupt and returns control to the program which called the counting routine. At that point the count number residing in the counter indicates the time duration between either rising or falling edges (depending on which edge the interrupt occurs).

Figure 6:
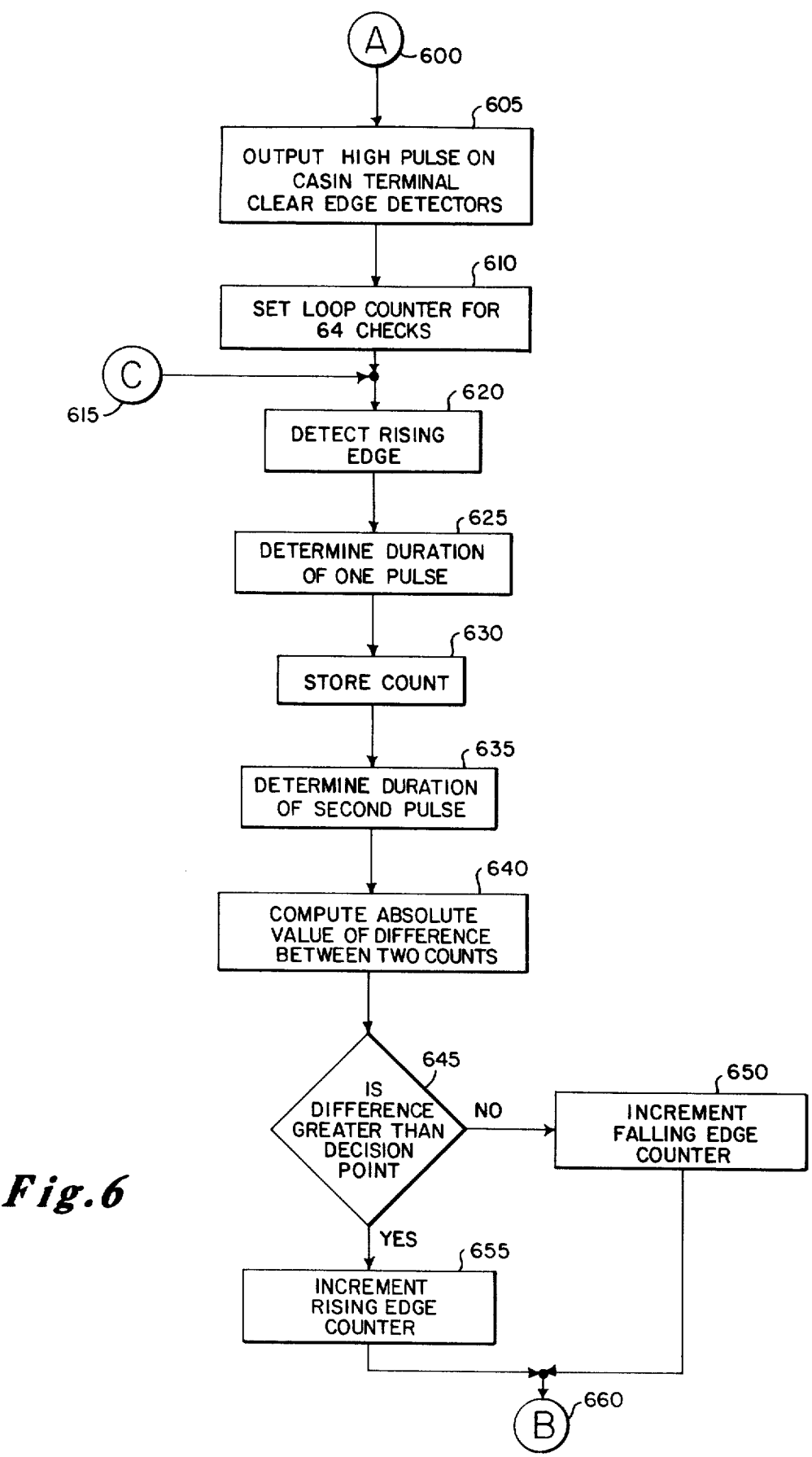
FIGS. 6 and 7 show flow charts of the software program used in the computer to achieve synchronization.
Figure 7:
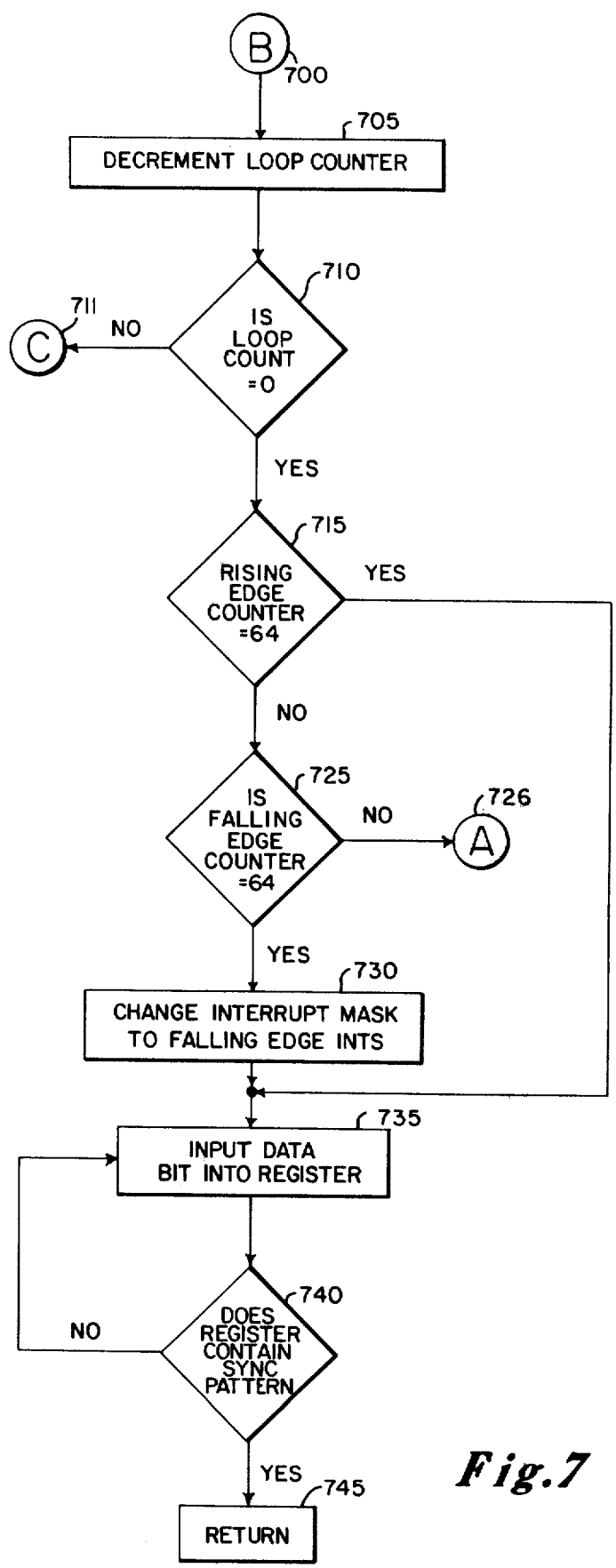

The computer routine which interacts with the circuitry in the tape recorder interface to detect bit cell boundaries and synchronize to the incoming data is shown in FIGS. 6 and 7. Prior to executing this routine, the computer performs various checks (not shown) to ensure that the system is not attempting to synchronize on noise signals. Typically, these checks may include the repetitive sampling of data to ascertain whether the data falls within certain specified limits and therefore constitutes proper digital signals. After the computer has determined that it is, in fact, looking at actual data, it enters the synchronization routine via step 600.

In step 605, the routine clears both edge counters. The computer then proceeds to step 610 in which a "loop counter" is set to 64. The loop counter counts the number of checks that are made during the routine. Repetitive checks are necessary to ensure that the system does not attempt an improper sysnchronization to noise.

In step 620, the computer detects a rising edge. This is done by calling the aforementioned counting routine which will then return control to the synchronization routine upon a rising edge interrupt.

In step 625, the computer determines the duration of one "pulse" which consists of the time interval between two successive rising edges. It does this by again calling the counting routine and interrupting on a rising edge. Since the counting routine has just returned on the rising edge due to step 620, the first interrupt that occurs on a rising edge will result in the counting routine producing a count number which is proportional to the time duration occurring between two successive rising edges.

In step 630 this count is stored. The computer again calls the counting routine which returns a count number for the time duration that started upon the detection of the second rising edge and terminated on the detection of the third rising edge. The number produced by the counting routine is therefore proportional to the duration of the second "pulse" interval occurring between successive rising edges.

In step 640, the count produced in step 635 is subtracted from the count stored in step 630 and the absolute value of the difference is taken.

In step 645, this difference is compared to a predetermined decision number or "point". If this difference is greater than the predetermined decision number, in step 655 the rising edge counter is incremented and the routine proceeds, via step 660 and 700, to step 705, where the loop counter is decremented by one.

In step 710, the loop count is checked. If it is not equal to zero the routine returns, via steps 711 and 615, to continue timing.

If, on the other hand, in step 645 the computed difference is less than the decision number, the computer increments the falling edge counter in step 650 and continues via steps 650, 700 and 705 to decrement the loop counter.

At some point, in a subsequent pass through the timing loop, the loop count will equal 0 indicating that 64 timing checks have taken place. When this occurs, in step 715 the computer checks to see whether 64 consecutive rising edges have been detected. If so, this indicates that the system has been properly synchronized to rising edges and the computer proceeds to step 735 in which the incoming data is examined for synchronization to obtain byte synchronization.

If, on the other hand, in step 715 the rising edge count is not equal to 64 indicating that 64 consecutive rising edges have not been detected, the computer proceeds to step 725 in which checks to see whether 64 falling edges have been detected. If not, this indicates that there has been an error during the detection or timing routines and the computer returns, via step 726 and 600, to the beginning of the routine and attempts to resynchronize at the bit level.

If, in step 725, however, 64 falling edges have been counted indicating proper synchronization on a falling edge then in step 730 the interrupt mask is changed. This change, in turn, causes the computer to enter the interrupt routine via step 501 for the falling edge interrupts.

In either case, eventually the computer proceeds to step 735 in which byte synchronization is achieved. In this step the time intervals either between rising or falling edges (as determined by the previous synchronization routine) are timed using the counting routine and the interrupt routine as previously described. The resulting time durations are compared to preset limits to determine whether a "0" or a "1" has been received. The corresponding "0" or "1" levels are entered into a register sequentially as shown in step 735.

In step 740, the contents of the register are compared to the predetermined synchronization pattern (illustratively, the synch word is 07F in hexdecimal notation). If the contents of the register do not equal the synchronization pattern, the computer returns to step 735 and inserts an additional bit into the register simultaneously shifting out the bit shifted into the register eight periods earlier. This operation is continued until the synch pattern appears in the register and byte synchronization is achieved. In this case if the routine proceeds to step 745 returning control of the system to the main program.

Although one illustrative embodiment of the invention has been shown other modifications and changes within the spirit and scope of the invention would occur to those skilled in the art. For example, it is apparent that different computer routines may be used to achieve alternative embodiments within the scope of this invention.

An illustrative coding of the previously described routines are set forth in Z-80 machine language on the following pages. This language is suitable for use with the Z-80 microprocessor integrated chip manufactured by Zilog, Inc., Cupertino, California. The Z-80 language is explained and described in the "Z-80 User's Programming Manual," published by Zilog, Inc., Cupertino, California.

```
00100              HEADER    '500 BAUD CASSETTE ROUTINES'
00110
00120      ;DATE    /03/80
00130      ;GENER   . A DATA OR CLOCKING PULSE
00140
00150      CTPULS   LD        A,1
00160               OUT       (CASIO),A      ;MAKE TOP OF PULSE
00170               LD        B,13
00180      CT1      DJNZ      CT1            ;WAIT 80 USEC
00190               LD        A,2
00200               OUT       (CASIO),A      ;MAKE BOTTOM OF PULSE
00210               LD        B,13
00220      CT2      DJNZ      CT2            ;WAIT 80 USEC
00230               CALL      CTSTAT         ;TERMINATE PULSE
00240               LD        B,120          ;WAIT 771 USEC
00250      CT3      DJNZ      CT3
00260               RET
00270
00280      ;***********************************************************
00290      ;
00300      ; LOCATION 2C8AH IN C2 ROM IS PATCHED TO JUMP TO THIS ADDRESS.
00310      ;    DO NOT CHANGE 'CTOFFX' ADDRESS WITHOUT NOTING THE CHANGE IN C2 ROM.
00320      ;
00330      CTOFFX:  LD        HL,2CA5H       ;ADDRESS OF 'BAD' MESSAGE FOR CLOAD?
00340      ;***********************************************************
00350
00360      ;TURN CASSETTE MOTOR OFF
00370
00380      CASOFZ   LD        A,(MSKSTA)     ;GET OLD INTERRUPT STATUS
00390               OUT       (MASK),A       ;PUT STATUS TO INTERUPT REG
00400               IN        A,(0FFH)       ;CLEAR INTERRUPT REGISTER
00410               LD        A,(IOSTAT)     ;GET STATUS OF STATUS I/O
00420               AND       0FDH           ;RESET CASS MOTOR BIT
00430               CALL      CASET          ;SET STATUS TO OFF
00440               EI
00450               RET
00460
00470      ;CTON IS CASSETTE TURN ON ROUTINE
00480
00490      CTON     EX        DE,HL
00500               EX        (SP),HL        ;PUT DE TO STACK
00510               PUSH      BC             ;PUT BC TO STACK
00520               PUSH      HL             ;PUT RET ADDR TO STACK
00530               EX        DE,HL          ;PLACE HL IN HL
00540               IN        A,(0ECH)
00550               LD        DE,2020H       ;CLEAR CASSETTE VIDEO
00560               LD        (CRT+62),DE    ;DISPLAY MESSAGE
00570               CALL      CTON0          ;TURN CASSETTE ON
00580               LD        BC,32000       ;SET UP DELAY OF 520MSEC
00590               JP        PAUSE          ;EXIT IN PAUSE
00600      ;PAUSE DELAYS 33 T-STATES OR 16.27USEC FOR EACH BC COUNT
00610      CTON0    LD        A,(IOSTAT)     ;GET CASSETTE SWITCH BYTE
00620               OR        2              ;CASS MOTOR ON
00630      CASET    LD        (IOSTAT),A     ;PUT OUT NEW I/O STATUS
00640               OUT       (IOSEL),A      ;TURN MOTOR ON
00650               RET
00660
00670      ;OUTPUT TO CASSETTE LATCH (CLEAR INPUT DATA LATCH)
00680
00690      CTSTAT   XOR       A              ;SET FOR MIDPOINT
00700      CTCHG    OUT       (CASIO),A
00710               RET
00720
00730      ;ROUTINE TO CORRECT FOR PRINT# AND SWITCH TO 500 BAUD
00740
00750      LK       LD        A,(HL)
00760               SUB       23H            ;SEE IF # CHARACTER
00770               JP        NZ,SWTC1       ;SKIP IF NOT
00780               CALL      2801H          ;GETIN2
00790               RST       8              ;SYNTAX CHECK
00800               DEFB      ','            ;COMPARE TO ','
00810               RET                      ;RETURN TO 500 BAUD ROUTINE
00820
```

```
00830        ;CAPTURE ONE BYTE OF DATA FROM CASSETTE
00840
00850  RDATA  LD    B,8
00860  CTB0   CALL  CTBIT           ;GET ONE BIT
00870         DJNZ  CTB0            ;LOOP FOR 8 BITS
00880  CTB1   LD    A,(BLINK)       ;GET BLINK COUNTER
00890         INC   A
00900         AND   5FH             ;MASK ANY COUNT OVER 32
00910         LD    (BLINK),A       ;REPLACE BLINK COUNTER
00920         JR    NZ,CTB2
00930         LD    A,(CRT+63)      ;GET * OR SPACE
00940         XOR   0AH             ;COMPLIMENT IT
00950         LD    (CRT+63),A      ;PUT IT BACK
00960  CTB2   LD    A,D             ;MOVE DATA TO A REG
00970         JR    EXITBC
00980
00990        ;CAPTURES ONE DATA BIT FROM CASSETTE
01000
01010  CTBIT  PUSH  BC
01020  CB0    IN    A,(CASIO)       ;ATTEMPT TO GET A BIT
01030         RLA                   ;PUT BIT TO CARRY
01040         JR    C,CB1           ;JR IF GOT BIT
01050         CALL  BRKCHK          ;CHECK FOR BREAK KEY
01060         JR    Z,CB0           ;LOOP IF NO BREAK
01070         JP    ABORT
01080  CB1    LD    B,110           ;CASSETTE TIMING 703 USEC
01090  CB2    DJNZ  CB2
01100         CALL  CTSTAT          ;CLEAR READ LATCH
01110         LD    B,152           ;CASSETTE TIMING 974 USEC
01120  CB3    DJNZ  CB3
01130         IN    A,(CASIO)       ;GET DATA BIT
01140  CB4    POP   BC
01150         RLA                   ;PUT NEW BIT INTO CARRY
01160         RL    D               ;ADD NEW BIT TO BYTE
01170         JR    CTSTAT          ;CLEAR READ LATCH
01180
01190        ;OUTPUT ONE DATA BYTE TO CASSETTE (FROM REG A)
01200
01210  WDATA  PUSH  AF
01220         PUSH  BC
01230         PUSH  DE
01240         LD    C,B             ;SET COUNT FOR 8 BITS
01250         LD    D,A             ;SAVE DATA IN REG D
01260  BYT0   CALL  CTPULS          ;GENERATE CLOCKING PULSE
01270         RLC   D               ;ROTATE DATA BIT TO CARRY
01280         JR    NC,BYT2         ;ADJUST TIME IF BIT = 0
01290         CALL  CTPULS          ;OUTPUT DATA PULSE
01300  BYT1   DEC   C               ;DEC THE BIT COUNTER
01310         JR    NZ,BYT0         ;CONTINUE IF NOT DONE
01320  EXITD  POP   DE
01330  EXITB  POP   BC
01340         POP   AF
01350         RET
01360  BYT2   LD    B,154           ;DELAY TIMING
01370  BYT3   DJNZ  BYT3            ;W    986 USEC
01380         JR    BYT1
01390
01400        ;TURN ON CASSETTE AND GENERATE SYNC BYTE
01410
01420  WSYNC  PUSH  HL
01430         LD    HL,WDATA        ;PLACE WDATA INTO POINTER
01440         LD    (WRILOC),HL     ;SAVE IT
01450         LD    B,83            ;SET COUNT
01460         XOR   A
01470  CSAV1  CALL  WDATA           ;OUTPUT A BYTE
01480         DJNZ  CSAV1           ;CONTINUE FOR COUNT
01490         LD    A,0A5H          ;LOAD SYNC BYTE
01500         CALL  WDATA           ;OUTPUT IT
01510         JR    EXITH
01520
01530        ;TURN CASSETTE ON AND READ SYNC DATA
01540
```

```
01550   RSYNC   PUSH    HL
01560           LD      HL,RDATA        ;CHANGE READ DATA POINTER
01570           LD      (REDLOC),HL     ;STORE IT
01580   HEADR   LD      B,64            ;SET COUNTER FOR 64
01590           LD      D,0             ;CLEAR DATA REG
01600   HEADR1  CALL    CTBIT           ;GET DATA BIT IN D REG
01610           LD      A,D             ;MOVE DATA TO A REG
01620           OR      A               ;SEE IF DATA "0"
01630           JR      NZ,HEADR        ;JUMP IF NOT "0"
01640           DJNZ    HEADR1          ;LOOP TILL GET 64 GOOD COUNTS
01650   CLOD1   CALL    CTBIT           ;READ BIT FROM CASSETTE
01660           LD      A,D             ;MOVE DATA TO A REG
01670           CP      0A5H            ;SEE IF SYNC BYTE
01680           JR      NZ,CLOD1        ;IF NOT KEEP LOOKING
01690   CLOD2   LD      HL,2A2AH        ;OUTPUT '**'
01700           LD      (CRT+62),HL     ;DISPLAY MESSAGE
01710           LD      A,H             ;SET UP A REG
01720   EXITH   POP     HL
01730   EXITBC  POP     BC
01740           POP     DE
01750           RET
01760
01770           HEADER  '1500 BAUD CASSETTE ROUTINES'
01780   ;WSYNC ROUTINE WRITES OUT HEADER OF 256 BYTES OF 55H
01790   ;AND THEN OUTPUTS SYNC BYTE OF 07FH USING 8 BIT BYTES
01800
01810   SYNCW   PUSH    HL
01820           LD      HL,DATAW        ;PLACE DATAW INTO POINTER
01830           LD      (WRILOC),HL     ;STORE IT
01840           LD      B,0             ;HEADER OF 256 BYTES
01850   SYNLP1  LD      A,55H           ;LOAD HEADER BYTE
01860           CALL    DATAWA
01870           DJNZ    SYNLP1          ;LOOP FOR 256
01880           LD      A,07FH          ;LOAD SYNC BYTE
01890           CALL    DATAWA          ;OUTPUT SYNC BYTE
01900           LD      A,0A5H          ;DUPLICATE SYNC BYTE RET
01910           JR      EXITH
01920
01930   ;WRITE 1500 BAUD BYTE TO CASSETTE
01940
01950   ;1 OUT IS 758 T-STATES OR 373 USEC PER CYCLE
01960   ;0 OUT IS 1535 T-STATES OR 757 USEC PER CYCLE
01970   ;ALL DATA WORDS ARE 9 BITS LONG WITH THE FIRST BIT IGNORED
01980
01990   DATAWA  PUSH    AF
02000           PUSH    BC
02010           PUSH    DE
02020           LD      C,A             ;MOVE DATA BYTE TO C REG
02030           JR      DATAW1          ;8 BIT ENTRY ROUTINE
02040   DATAW   PUSH    AF
02050           PUSH    BC
02060           PUSH    DE
02070           LD      C,A             ;SAVE DATA TO BE OUTPUT
02080           CALL    BIT0
02090   DATAW1  LD      B,8             ;SET COUNTER TO OUTPUT BYTE
02100   DATAW2  CALL    BITOUT          ;CALL OUTPUT BYTE ROUTINE
02110           DJNZ    DATAW2
02120           JR      EXITD
02130
02140   ;READ DATA BYTE ROUTINE
02150
02160   DATAR   CALL    SEEK            ;LOAD IN DUMMY BIT
02170           LD      B,8             ;LOOK FOR 8 BITS
02180   DATAR1  CALL    SEEK            ;LOOK FOR PULSE COUNT
02190           CALL    CONVRT          ;CONVERT COUNT TO DATA
02200           DJNZ    DATAR1          ;KEEP LOOPING UNTIL GET 8 BITS
02210           JP      CTB1            ;JUMP TO BLINK AND EXIT
02220
02230   ;SYNCR WILL SEEK GOOD HEADER, DETERMINE WHETHER TO USE THE
02240   ;RISING OR FALLING EDGE AND WILL FIND THE SYNC BYTE
02250
02260   SYNCR   PUSH    HL
```

```
02270           LD      HL,DATAR        ;PUT DATAR INTO POINTER
02280           LD      (REDLOC),HL     ;STORE IT
02290           LD      A,1             ;SET INTERUPT TO RISING EDGE
02300           OUT     (MASK),A
02310   BAD     LD      B,80H           ;LOOK FOR GOOD PULSES
02320   ;THIS ROUTINE TAKES 52 T-STATES LESS FOR 2ND PULSE OVER 1ST PULSE
02330   LOOK    CALL    SEEK            ;GO GET PULSE COUNT
02340           LD      A,C
02350           CP      LOWCT           ;FIND IF COUNT IS > LOWER LIMIT
02360           JR      C,BAD           ;RESTART LOOP IF BAD COUNT
02370           CP      HIGHCT          ;FIND IF COUNT < UPPER LIMIT
02380           JR      NC,BAD          ;RESTART LOOP IF BAD COUNT
02390           DJNZ    LOOK            ;GET 128 GOOD COUNTS
02400   EDGE    LD      HL,0            ;ZERO H AND L REG
02410           LD      B,64            ;LOOP THROUGH 64 TIMES
02420   EDGE1   CALL    SEEK            ;INPUT DUMMY BIT TO SYNCRONIZE DATA
02430           CALL    SEEK            ;INPUT 1ST BIT
02440           LD      D,C             ;SAVE IN D REG
02450           CALL    SEEK            ;GET SECOND COUNT
02460           LD      A,D             ;MOVE FIRST COUNT TO A REG
02470           SUB     C               ;GET DIFFERENCE OF COUNTS
02480           JR      NC,EDGE2        ;NEED TO NEG IF NOT POSITIVE
02490           NEG                     ;CHANGE RESULT TO POSITIVE NUMBER
02500   EDGE2   CP      DHALF           ;SEE IF DIFFERENCE < OR > THEN 1/2
02510           JR      C,INCL          ;INCREMENT FALLING EDGE COUNT
02520   INCH    INC     H               ;INCREMENT RISING EDGE COUNT
02530           DJNZ    EDGE1           ;LOOP FOR MORE COUNTS
02540           JR      CHEZK           ;CHECK TO SEE RESULTS OF COUNT
02550   INCL    INC     L               ;INCREMENT FALLING EDGE COUNT
02560           DJNZ    EDGE1
02570   CHEZK   LD      A,64            ;SET REG A WITH COMPARE COUNT
02580           CP      H               ;SEE IF 64 COUNTS IN H REG
02590           JR      Z,SETFR         ;KEEP RISING EDGE
02600           CP      L               ;SEE IF 64 COUNTS IN L REG
02610           JR      NZ,EDGE         ;IF ZERO CHANGE TO FALLING EDGE
02620   SETF    LD      A,2             ;SET INTERRUPT MASK FOR FALLING EDGE
02630           OUT     (MASK),A
02640           CALL    SEEK            ;TO KEEP FROM BAD DATA READ
02650   SETFR   LD      D,0
02660   FDSYNC  CALL    SEEK            ;START LOOKING FOR SYNC BYTE
02670           CALL    CONVRT          ;CONVERT TO DATA BIT
02680           LD      A,D             ;MOVE BYTE TO REG A
02690           CP      07FH            ;IS    IF SYNC BIT
02700           JR      NZ,FDSYNC       ;LOOP TILL GET SYNC
02710           JP      CLOD2           ;PUT ** ON SCREEN AND RETURN
02720
02730   BITOUT  RLC     C               ;ROTATE CARRY BIT LEFT TO CARRY
02740           JR      NC,BIT0         ;IF NO CARRY OUTPUT 0 BIT
02750   BIT1    LD      DE,1217H        ;LOAD D WITH 18, E WITH 17
02760           JR      BIT3
02770   BIT0    LD      DE,2B2FH        ;LOAD D WITH 43, E WITH 47
02780   BIT3    DEC     D
02790           JR      NZ,BIT3         ;TIMING FOR HIGH OUT
02800           LD      A,2
02810           OUT     (CASIO),A       ;OUTPUT LOW PART OF PULSE
02820   BIT4    DEC     E
02830           JR      NZ,BIT4         ;TIMING FOR LOW OUT
02840           LD      A,1
02850           OUT     (CASIO),A       ;OUTPUT HIGH PART OF PULSE
02860           RET
02870
02880   ;INTERRUPTABLE PULSE LENGTH ROUTINE
02890   ;COUNT = C * 30 T-STATES + 11 T-STATES
02900
02910   SEEK    EI                      ;TURN ON INTERRUPTS
02920           LD      C,0             ;CLEAR COUNTER
02930   SEEK1   INC     C               ;START OF COUNT LOOP
02940           LD      A,(3840H)       ;SCAN BREAK KEY
02950           AND     4               ;MASK BREAK KEY
02960           JR      Z,SEEK1         ;CONTINUE COUNT LOOP UNLESS BREAK
02970           DI                      ;DISABLE INTERRUPTS
02980
```

```
02990           ;ABORT ROUTINE WILL PLACE A 'BK' ON THE SCREEN AND RETURN
03000           ;TO BASIC WITH READY
03010
03020   ABORT   LD      HL,4842H        ;SET UP 'BK' MESSAGE
03030           LD      (CRT+62),HL     ;DISPLAY MESSAGE
03040           JP      READY           ;JUMP TO READY
03050
03060           ;ERROR MESSAGES
03070           ;BK = BREAK KEY
03080           ;C = CHECKSUM ERROR
03090           ;D = DATA OUT OF LIMITS
03100           ;** = SYNC BYTE HAS BEEN READ
03110
03120           ;CASSETTE INTERRUPT ROUTINE
03130           ;POLLING TAKES 77 (T-STATES) FOR RISING OR 91 FOR FALLING EDGE
03140           ;CASINT TAKES 103 OR 91 T-STATES
03150           ;TOTAL INTERRUPT TIME IS 180 OR 182  T-STATES OR 6 COUNTS FOR C
03160
03170   RCASIN  LD      E,1             ;SET E FOR RISING EDGE
03180           JR      CASINT          ;JR TO ROUTINE
03190   FCASIN  LD      E,0             ;SET E FOR FALLING EDGE
03200   CASINT  LD      A,6
03210           ADD     A,C
03220           LD      C,A             ;WILL LOAD 6 TO CORRECT COUNT
03230           IN      A,(CASIO)       ;CLEAR INT AND READ DATA
03240           AND     1               ;LOOK ONLY AT CASSETTE DATA
03250           CP      E               ;SEE IF DATA MATCHES E
03260           JR      NZ,EXTRA        ;NO MATCH, THEN FALSE TRIGGER
03270           POP     AF
03280           POP     AF
03290           RET
03300   EXTRA   POP     AF
03310           EI                      ;EI SO CAN RETURN TO SEEK
03320           RET
03330
03340           ;ROUTINE TO CONVERT TIMES INTO 1 OR 0
03350           ;TAKES 60 T=STATES OR 2 COUNTS TO PROCESS DATA
03360
03370   CONVRT  LD      A,C             ;MOVE COUNT TO REG A
03380           CP      HALF            ;SEE IF DATA 1 OR 0
03390           RL      D               ;ROTATE CARRY BIT TO D REG
03400           CP      LOWCT           ;SEE IF COUNT TOO LOW
03410           JR      C,ERROR1        ;OUTPUT C IF OUT OF RANGE
03420           CP      HIGHCT          ;SEE IF COUNT TOO HIGH
03430           RET     C               ;RETURN IF NO ERROR
03440   ERROR1  LD      A,'D'           ;DATA ERROR MESSAGE
03450           LD      (CRT+62),A      ;DISPLAY CHARACTER
03460           RET
03470
03480           ;CONSTANTS FOR EQUATES
03490
03500   DHALF   EQU     13
03510   HALF    EQU     34
03520   LOWCT   EQU     15              ;LOWER COUNT LIMIT
03530   HIGHCT  EQU     62              ;HIGH COUNT LIMIT
```

What is claimed is:

1. In a digital information processing system wherein digital information is encoded by an encoding waveform in a series of bit cells having one of two distinct time durations, each bit cell containing a portion of said encoding waveform and the inverse of said portion, said waveform having signal transitions of positive and negative polarity, said system having means for inserting into said bit cell series a predetermined synchronization pattern consisting of bit cells having one of said time durations, alternating with bit cells having the other of said time durations, and synchronizing apparatus for detecting cell boundaries in said bit cell series and in the inversion of said series comprising,
  means responsive to said encoding waveform for timing at least two time durations occurring between successive pairs of signal transitions of the same polarity,
  means responsive to timed durations of portions of said synchronization pattern for computing the difference of said time durations, and
  means responsive to said difference for locating said bit cell boundaries.

2. In a digital information processing system, synchronizing apparatus according to claim 1 wherein said timing means generates an output corresponding to each sequential waveform portion wherein the magnitude of said output is representative of the time duration between a successive pair of transitions of the same polarity.

3. In a digital information processing system, synchronizing apparatus according to claim 2 wherein said computing means includes means responsive to said timing means outputs for subtracting the magnitudes of a successive pair of outputs to form a difference number and means for computing the absolute value of said difference number.

4. In a digital information processing system, synchronizing apparatus according to claim 3 wherein said locating means is responsive to said absolute value for comparing said absolute value to a predetermined decision number and for selecting positive-going transitions as bit cell boundaries when said absolute value is greater than said decision number and for selecting negative-going transitions as bit cell boundaries when said absolute value is less than said decision number.

5. In a digital information processing system wherein digital information is encoded in a series of bit cells, each bit cell having either a first or second distinct time duration and consisting of a pulse having positive and negative signal transitions and its inversion, said system including means for inserting into a predetermined location in said bit cell series a synchrnonizing pattern consisting of alternating bit cells of first and second duration, apparatus for detecting the boundaries between bit cells in a bit cell series and in an inverted bit cell series comprising,
  means responsive to at least three successive signal transitions of the same polarity in said synchronizing pattern for timing the duration of a first and a second time intervals occurring between two successive signal transitions of the same polarity,
  means responsive to said first and second time durations for computing the difference thereof, and
  means responsive to the magnitude of said difference for selecting signal transitions of one polarity as the boundary between successive bit cells.

6. In a digital information processing system, synchronizing apparatus according to claim 5 wherein said timing means produces a first and a second number respectively representative of the time duration of two sequential time intervals occurring between successive signal transitions of the same polarity.

7. In a digital information processing system, synchronizing apparatus according to claim 6 wherein said computing means includes means responsive to said first and second numbers for subtracting said numbers to form a difference number and means for computing the absolute value of said difference number.

8. In a digital information processing system, synchronizing apparatus according to claim 7 wherein said selecting means comprises means responsive to said absolute value and to a predetermined decision number for selecting signal transitions of one polarity as bit cell boundaries when said absolute value is greater than said decision number and for selecting signal transitions of another polarity as bit cell boundaries when said absolute value is less than said decision number.

9. In a digital to frequency modulation interface for a computer system in which digital information bits are encoded in bit cells, each bit cell consisting of a single cycle of an oscillatory waveform having one of two distinct frequencies, said interface having means for inserting into a predetermined location in a bit cell series a synchronizing pattern consisting of bit cells containing waveforms of said first frequency alternating with bit cells containing waveforms of said second frequency, synchronizing apparatus for detecting the boundaries between bit cells in said bit cell series and in an inverted bit cell series comprising,
  means responsive to said synchronizing pattern for producing a first and a second number respectively representative of the time durations of at least two sequential cycles of said waveform,
  means responsive to said first and second numbers for forming the difference thereof,
  means responsive to said difference and to a predetermined decision number for selecting positive-going transitions as bit cell boundaries when said difference is greater than said decision number and for selecting negative-going transitions as bit cell boundaries when difference is less than said decision number.

10. In a digital to frequency modulation interface further having a clock for producing clock signals at a predetermined frequency, synchronizing apparatus according to claim 9 wherein said number producing means comprises,
  an edge detector responsive to each rising waveform edge in said synchronizing pattern and an enable signal for producing an edge detection signal,
  an edge detector responsive to each falling waveform edge in said synchronizing pattern and an enable signal for producing a edge detection signal, means for generating an enable signal to enable one of said rising edge detector and said falling edge detector, a counter, and means responsive to said clock signals and said edge signals for controlling said counter to produce a first count number corresponding to the number of clock signals occurring in the time duration between a first and a second waveform edge and to produce a second count number corresponding to the number of clock signals occurring in the time duration between said second and a third waveform edge.

11. Synchronizing apparatus according to claim 10 wherein said difference forming means comprises means for subtracting said second count number from said first count number to form a difference number.

12. Synchronizing apparatus according to claim 11 wherein said selecting means comprises, a rising edge counter, a falling edge counter, means for incrementing said rising edge counter when said difference number is greater than said decision number, means for incrementing said falling edge counter when said difference number is less than said decision number, and means responsive to the count in said rising edge counter and the count in said falling edge counter for selecting positive-going transitions if a predetermined number of successive rising edges are detected and for selecting negative-going edges when a predetermined number of successive falling edges are detected.

13. In a digital information processing system wherein digital information is encoded in a series of bit cells having one of two distinct time durations, each bit cell containing a portion of an encoding waveform and the inverse of said portion, said waveform having signal transitions of positive and negative polarity, said system including means for inserting into said bit cell series a predetermined synchronization pattern consisting of bit cells having one of said time durations alternating with bit cells having the other of said time durations, a method for detecting bit cell boundaries in said bit cell series and in the inversion of said bit cell series comprising the steps of:

A. timing at least two time durations occurring between successive pairs of signal transitions of the same polarity in said synchronization pattern;

B. computing the difference of said time durations; and

C. locating said bit cell boundaries depending on the magnitude of said difference.

14. In a digital information processing system having a clock generator for generating clock pulses at regular intervals, the method of claim 13 wherein step A comprises the further steps of:

D. detecting a signal transition of a first polarity,

E. starting a counter to count said clock pulses when the signal transition is detected, F. storing the count in the counter as representative of the time between a first two successive transitions when a second signal transition of the same polarity as detected in step D is detected, G. resetting said counter, and H. storing the count in the counter as representative of the time between a second two successive transitions when a third signal transition of the same polarity as detected in step D is detected.

15. The method of claim 14 wherein step B comprises the further steps of:

I. subtracting the counts stored in steps E and F, and

J. taking the absolute value of the resulting difference.

16. The method of claim 15 wherein step C comprises the further steps of:

K. selecting positive-going transitions as bit cell boundaries when the absolute value determined in step J is greater than a predetermined decision number; and L. selecting negative-going transitions as bit cell boundaries when the absolute value determined in step J is less than said decision number.

17. In a digital frequency modulation interface for a computer system in which digital information bits are encoded in bit cells, each bit cell consisting of a single cycle of an oscillatory waveform having one of two distinct frequencies, said system having means for inserting into a predetermined location in said bit cell series a synchronizing pattern consisting of bit cells containing waveforms of said first frequency alternating with bit cells containing waveforms of said second frequency, a method for detecting the boundaries between bit cells in a bit cell series and in an inverted bit cell series comprising the steps of:

A. computing a first and a second number respectively representative of the time durations of at least two sequential cycles of said waveform;

B. forming the difference of said first and second numbers;

C. selecting positive-going transitions as bit cell boundaries when said difference is greater than a predetermined decision number; and D. selecting negative-going transitions as bit cell boundaries when difference is less than said decision number.

18. The method of claim 17 wherein step A comprises the further steps of:

E. detecting a waveform edge of a first polarity,

F. starting a counter to count said clock pulses when the waveform edge is detected, G. storing the count in the counter as representative of the time duration of a first waveform cycle when a second waveform edge of the same polarity as detected in step D is detected, H. resetting said counter, and I. storing the count in the counter as representative of the time duration of a second waveform cycle when a third waveform edge of the same polarity as detected in step D is detected.

19. The method of claim 18 wherein step C comprises the further steps of:

J. incrementing a rising edge count when said difference is greater than said decision number, K. incrementing a falling edge count when said difference is less than said decision number, L. selecting positive-going transitions as bit cell boundaries when the the rising edge count indicates that a predetermined number of sucessive rising edges have been detected, and M. selecting negative-going edges as bit cell boundaries when the falling edge count indicates that a predetermined number of successive falling edges have been detected.

20. In a digital to frequency modulation interface for a computer system in which digital information bits are encoded in bit cells, each bit cell consisting of a single cycle of an oscillatory waveform having one of two distinct frequencies, said system having a clock for generating periodic clock signals, a computer, means for inserting into a predetermined location in a bit cell series a synchronizing pattern consisting of bit cells containing waveforms of said first frequency alternating with bit cells containing waveforms of said second frequency and interrupt circuitry for interrupting the normal processing of the computer in response to interrupt signals, synchronizing apparatus for detecting the boundaries between bit cells in said bit cell series and in an inverted bit cell series comprising, an edge detector responsive to each rising waveform edge in said synchronizing pattern and an enable signal for producing an edge detection signal, an edge detector responsive to each falling waveform edge in said synchronizing pattern and an enable signal for producing a edge detection signal, an enable register for generating a rising edge enable signal to enable said rising edge detector and for generating a falling edge enable signal to enable said falling falling edge detector, means controlled by said computer for setting said enable register to generate a rising edge enable signal, circuitry for generating an interrupt signal when either of said rising edge detector and said falling edge detector has detected a waveform edge, a clock signal counter, means responsive to said clock signals and said interrupt signal for controlling said clock signal counter to produce a first count number corresponding to the number of clock signals occurring in the time duration between a first and a second waveform edge and to produce a second count number corresponding to the number of clock signals occurring in the time duration between said second and a third waveform edge, reset means responsive to said interrupt signal for generating a reset signal, gating means responsive to said reset signal for resetting said rising edge detector and said falling edge detector, means for subtracting said second count number from said first count number to form a difference number, a rising edge counter, a falling edge counter, a loop counter, means for periodically incrementing said loop counter, means for incrementing said rising edge counter when said difference number is greater than a predetermined decision number, means for incrementing said falling edge counter when said difference number is less than said decision number, means operable when said loop counter has reached a predetermined count and responsive to the count in said rising edge counter and the count in said loop counter for detecting a predetermined synchronization pattern if the count in said loop counter equals the count in said rising edge counter, and means operable when said loop counter reaches a predetermined count and responsive to the count in said falling edge counter and the count in said loop counter for setting said enable register to generate a falling edge enable signal if the count in said loop counter equals the count in said falling edge counter.

21. Synchronization apparatus according to claim 20 wherein said means for detecting a predetermined synchronization pattern comprises, a shift register means responsive to said rising edge enable signal and said falling edge enable signal for shifting the binary value of each successive bit in said bit cell series sequentially through said shift register, and means responsive to the bit values in said shift register for detecting when a predetermined pattern of bit values is in said register.

22. In a digital to frequency modulation interface for a computer system in which digital information bits are encoded in bit cells, each bit cell consisting of a single cycle of an oscillatory waveform having one of two distinct frequencies, said system having a clock for generating periodic clock signals, a computer, means for inserting into a predetermined location in a bit cell series a synchronizing pattern consisting of bit cells containing waveforms of said first frequency alternating with bit cells containing waveforms of said second frequency and interrupt circuitry for interrupting the normal processing of the computer in response to interrupt signals, a method for detecting the boundaries between bit cells in said bit cell series and in an inverted bit cell series comprising the steps of:

A. generating an interrupt signal when a rising waveform edge has been detected in said synchronization pattern, B. producing a first count number corresponding to the number of clock signals occurring in the time duration between a first and a second rising waveform edges when said interrupt signal is generated, C. producing a second count number corresponding to the number of clock signals occurring in the time duration between said second and a third rising waveform edges, D. subtracting said second count number from said first count number to form a difference number, E. incrementing a rising edge count when said difference number is greater than a predetermined decision number, F. incrementing a falling edge count when said difference number is less than said decision number, G. After a predetermined number of waveform edges have been detected, and if the count in said loop counter equals the count in said rising edge counter, detecting a predetermined synchronization pattern, and H. After a predetermined number of waveform edges have been detected, and if the count in said loop counter does not equal the count in said rising edge counter, generating an interrupt signal when a falling waveform edge has been detected in said synchronization pattern.

23. A method according to claim 22 wherein step G further includes the steps of:

I. checking a predetermined number of sequential bit cells in said bit cell series, and J. if the predetermined pattern is not detected in said predetermined number of sequential bits, removing one bit from the predetermined bit series and substituting another bit from said series therefor.

* * * * *